United States Patent [19]

Kuenzig et al.

[11] E Re. 30,215

[45] Reissued Feb. 19, 1980

[54] SEALING AND SHEARING MEMBER IN A PLASTIC RESIN BLOW MOLDING MACHINE

[75] Inventors: Ernest O. Kuenzig, Glen Head; Frank L. Pennino, Farmingdale, both of N.Y.

[73] Assignee: Forest Mechanical Products Corp., Kew Gardens, N.Y.

[21] Appl. No.: 918,447

[22] Filed: Jun. 23, 1978

Related U.S. Patent Documents

Reissue of:

[64] Patent No.: 4,032,278
Issued: Jun. 28, 1977
Appl. No.: 663,124
Filed: Mar. 2, 1976

[51] Int. Cl.[2] ..... B29C 17/07

[52] U.S. Cl. ..... 425/525; 425/527; 425/531; 425/532; 425/535

[58] Field of Search ..... 425/292, 525, 527, 531, 425/532, 535

[56] References Cited

U.S. PATENT DOCUMENTS

| | | | |
|---|---|---|---|
| 3,470,582 | 10/1969 | Martin, Jr. | 425/527 X |
| 3,806,587 | 4/1974 | Turner | 425/531 X |
| 3,869,237 | 3/1975 | Hellmer et al. | 425/527 |

FOREIGN PATENT DOCUMENTS

| | | | |
|---|---|---|---|
| 46-11991 | 3/1971 | Japan | 425/531 |

*Primary Examiner*—Jan H. Silbaugh
*Attorney, Agent, or Firm*—Eliot S. Gerber

[57] ABSTRACT

In a blow molding machine a tubular parison is extruded around a blow pin, a two-part mold is closed and the parison is expanded by air pressure against the internal wall of the mold. Each mold half at its top neck carries a sealing member comprising a first insert, which is a shear insert, in the form of an approximately flat one-half ring to sever the parison against the blow pin; a second insert, which is a seal insert, in the form of a flat approximately one-half ring, to seal the parison against the blow pin; and a base member, in the form of an approximately one-half ring, having an inverted shelf to locate and support the shear and seal inserts.

12 Claims, 8 Drawing Figures

SEALING AND SHEARING MEMBER IN A PLASTIC RESIN BLOW MOLDING MACHINE

Matter enclosed in heavy brackets [ ] appears in the original patent but forms no part of this reissue specification; matter printed in italics indicates the additions made by reissue.

BACKGROUND OF THE INVENTION

A number of machines have been proposed for producing bottles from plastic resin materials. One of the methods presently widely used to produce containers, such as bottles, from a thermoplastic resin, such as polyethylene, is called "blow molding."

In the blow molding process the plastic resin, generally in the form of pellets, is placed in a hopper. The hopper leads to an extrusion screw which, by means of pressure or heat and pressure, causes the solid pellets to flow into a viscous semi-fluid mass. The semi-fluid resin is forced by pressure to flow around a mandrel and through an extrusion die orifice which shapes it into a thin-walled elongated tube called a "parison."

At this stage in the blow molding process the parison, having just been forced from the extruder, is hot; for example, it may be about 350° F. The parison is then positioned over a blow tube and within an opened two-part mold. The mold is then closed and its sealing members seal the top and the bottom of the parison to form an air-tight unit. Air is then blown through the blow tube and into the inside of the parison, causing it to expand against the inner walls of the mold. The air is under high pressure, for example, 80 pounds per square inch, and is injected into the parison in a quick burst of pressure. The walls of the mold are cooled by circulating cold water, or a mixture of water and anti-freeze, in a constant stream through an outer jacket surrounding the mold face. The cold walls of the mold cool the resin and form the parison into a bottle. The air is then exhausted and the two mold halves are opened.

The mold is constructed in two halves which must be brought together quickly and in exact alignment in order to prevent escape of air. The top of the mold is sometimes called a "neck ring." The mold will form the body of the bottle and "flashing," usually at the top and bottom of the bottle. Since the opposite walls of the parison are hot and collapse together under pressure, they may coalesce to form the sheet-like flashing. The flashing consists of the collapsed opposite walls of the parison tube which have been brought together and which must subsequently be trimmed off from the bottle.

After the bottle is formed, the mold halves are opened and the bottom flashing may be used to pull the bottle out of the mold. This action of pulling the bottle will also remove the formed bottle from around the blow pipe. The bottles may be removed by fingers, i.e., metal snap members, which reach up and grab the bottom flashing, sometimes called a "tail." The fingers pull the bottle down onto a conveyor belt which conveys the bottles from the blow molding machine to subsequent machines in which the flashing is removed. The flashing material, which is generally at the neck of the bottle and at its bottom, may be re-used to form additional bottles.

This type of blow molding machine is generally described in U.S. Pat. No. 3,369,272; and U.S. Pat. No. 3,470,582 describes a somewhat similar machine. Both of these patents are assigned on their faces to Hoover Ball and Bearing Company. In U.S. Pat. No. 3,369,272 an "annular shearing edge 70" of "portions 68 of the mold sections 60" is used for sealing and shearing the neck of the formed plastic resin bottle. In U.S. Pat. No. 3,470,582 the "mold cavity neck portion 68" is used for separation of the parison.

From time to time there have been certain problems with this type of blow molding machine if a "pre-finish" neck is utilized, i.e., a neck formed by a shearing action in the mold. Upon closure of the mold parts, a sealing and shearing member is moved into a cylindrical hollow on the blow pin, leaving a gap filled by the resin parison, to form a seal using the parison. Then the sealing neck member attached to the blow pipe, called a "blow pin," is moved axially upwards; and the rising blow pin shears the plastic resin of the neck by forcing it against the shearing and sealing member which remains level.

One problem may arise because the blow pipe is not supported at its bottom end. The blow pin is supported only by the blow pipe, which is a thin and lengthy tube and which must carry the compressed air and so is necessarily hollow. The blow pipe is under considerable thermal stress as it is surrounded by a fast-moving hot tube of formed plastic resin and intermittently receives blasts of compressed air. Due to all these factors, and due to human error and inexperience in both the axial and lateral adjustment of the blow pin, it may happen that the blow pin is not exactly centered or it is too high or too low. Not being centered means that an imaginary axis drawn through the center of the hollow and cylindrical blow pin would not be aligned with, or coincide with, the imaginary central axes of the two halves of the mold.

The non-centering or non-exact alignment of the blow pin may cause difficulties because the mold is closed under great pressure. If the blow pin has been misaligned, the sealing and shearing member, sometimes called "shear steels" or "shear rings," which meet the blow pin, may strike it with great force. This may damage the blow pin or, more frequently, may damage or cause undue wear or stress on those members.

These problems may be either aggravated or lessened by the presence of the plastic resin parison. The plastic resin parison acts as a lubricant and prevents wear which might otherwise occur between the metal members. On the other hand, the parison may present considerable difficulty in the event of non-exact alignment between the shearing member and the blow pin. If there is a misalignment of mis-matching, the plastic may become too thin, causing holes. If there is a hole, it will permit escape of the compressed air upon the compressed air stroke, resulting in a deformed or nonformed bottle.

One feature of the present invention provides a plastic resin severing and mold closure device to be utilized in a two-part mold blow molding machine. In such a blow molding machine a plastic resin parison is extruded in tubular form around a blow tube, and the blow tube delivers compressed air to expand the parison to form against the internal walls of a two-part separable mold having a top neck portion. The blow tube carries a cylindrical blow pin having a cylindrical shoulder portion and a cylindrical shear portion. The severing and mold closure device is removably affixed at the top neck portion of each of the two mold parts.

The closure device comprises a base member, preferably of an aluminum alloy, in the approximate form of a one-half ring seen in top view; and the base member has a flat top portion and a descending flange portion. The flange portion forms an inverted shelf seen in side view, and the base member is of a heat conductive metal alloy. The closure device further comprises a top insert, which is a seal insert in the form of a generally flat member and is approximately a one-half ring. The seal insert has an inner edge with an inner diameter which is close to, but not touching, the shoulder of the blow pin in order to compress, but not shear, the parison and thereby permit blow pressure with the parison upon closure of the mold.

A bottom insert, which is a shear insert, is in the form of a generally flat member and is approximately a one-half ring member. The shear insert has an inner edge which meets in a shearing action against the shear portion of the blow pin to shear the parison.

Both the seal insert and the shear insert are made of heat tempered, i.e., heat hardened, steel. The inner edge of the shear insert has an inner diameter which is less than the inner diameter of the inner edge of the seal insert. The closure device also provides means to removably fasten the shear insert to the seal insert and to the base member.

OBJECTIVES OF THE INVENTION

It is consequently an objective of the present invention to provide a sealing member which is attachable to each half of the mold at its upper portion, specifically at its neck ring, and which may be readily detached from those mold members by relatively inexperienced personnel.

It is a further objective of the present invention to provide such a sealing member which will be an excellent thermal conductor, and specifically will conduct the cold from the mold to the plastic resin when the resin is between the sealing member and the blow pin of the blow pipe.

It is a further objective of the present invention to provide such a sealing member which will have a half-ring seal insert which, if it should become worn or damaged, may readily be replaced in exact alignment by relatively inexperienced personnel.

It is a further objective of the present invention to provide such a sealing member which will have a pinch-off shear insert which is of hard heat-tempered material and which may be readily replaced by inexperienced personnel.

Other objectives of the present invention will be apparent from the following description providing the inventors' best mode of practicing the invention. The description set forth below should be taken in conjunction with the accompanying drawings.

BRIEF DESCRIPTION OF THE DRAWINGS

In the drawings:

As shown in FIG. 1, the sealing member 10 of the present invention consists of six parts, not including the bolts which connect those parts. FIG. 1 is an exploded view which illustrates the three parts which make up one-half of the complete sealing assembly. The symmetrical opposite half of the sealing assembly is also illustrated and will be explained subsequently.

As shown in FIG. 1, one-half of the sealing assembly includes a base ring 11. The base ring 11 is constructed of a hard metal which has excellent thermal conductive properties. The base ring 11 is preferably of high tensile strength aluminum alloy. The base ring 11 has as integral portions thereof a top platform portion 12 and flange portion 13. The platform portion 12 and flange portion 13 form a shelf 15 which is directed downward. The base 11 is generally in the form of one-half of a ring. However, it is carefully constructed so that it never fully closes with its opposite member, i.e., it never forms a complete closed ring. Each of the two ends of the base ring 11 has an open pocket or cavity. Each cavity is formed by an inside beveled shoulder 15, a top beveled shoulder 16, and an outside beveled shoulder 17.

Figure 1:
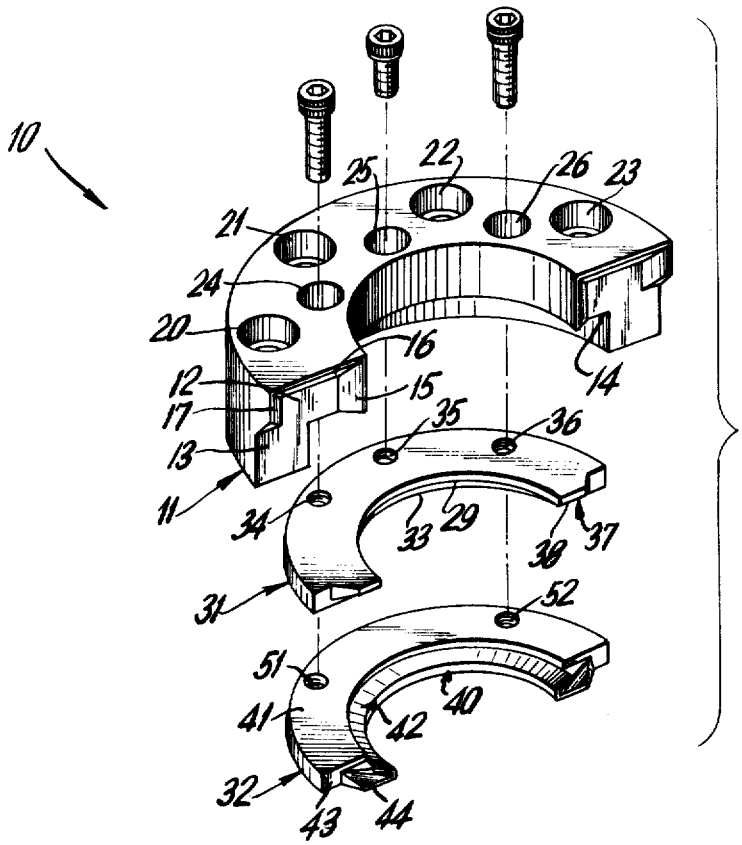
FIG. 1 is an exploded view of one-half of the sealing member of the present invention.

The base ring 11 has, in its half-ring form, four holes through it which are holes 20, 21, 22 and 23. These holes are utilized to fasten the base ring 11 to neck ring 30. Additionally, there are three inner holes which extend through the top portion of the base ring 11. These holes 24, 25 and 26 are used to fasten the inserts 31 and 32 to the base ring 11.

The seal insert 31, which is the upper insert, is a generally flat one-half ring member. It has a flat inner edge 29 and a and portion 33. It also has a screw-threaded hole 35 and clearance holes 34 and 36, which align with the holes 25, 24 and 26, respectively. Each of the symmetrical ends of the seal insert 31 has a protruding portion 37 having two bevels and a flat outer face 38.

The shear insert 32 is similar in many respects to the construction of the seal insert 31. However, the shear insert 32 has a slightly smaller inner diameter at its flat inner edge than the edge 29 of the seal insert 31. The flat inner edge 40 is between the flat top face 41 and the inward slanting cut-back 42.

Figure 6:
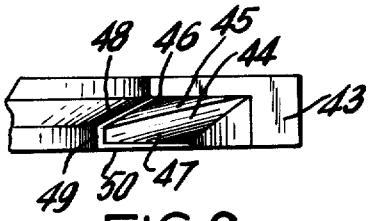
FIG. 6 is an enlarged view of one end of a bottom shear steel.
Figure 7:
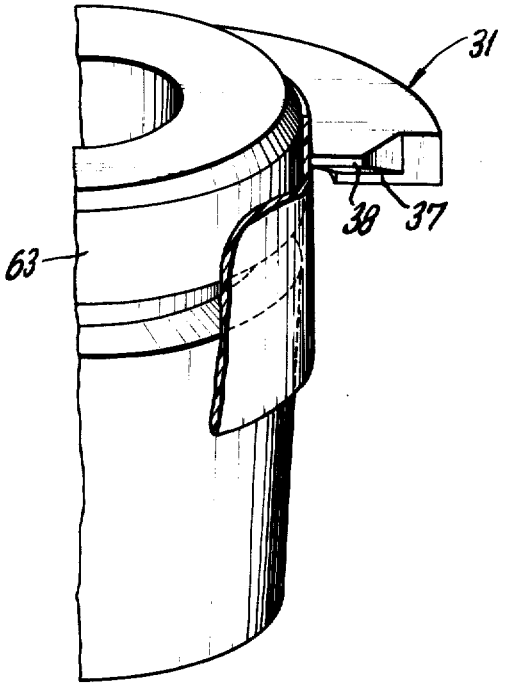
FIG. 7 is an enlarged perspective view showing the parison and the blow pin and the seal insert in the position in which the mold would be sealed air-tight as the parison is squeezed between the blow pin and the seal insert.
Figure 8:
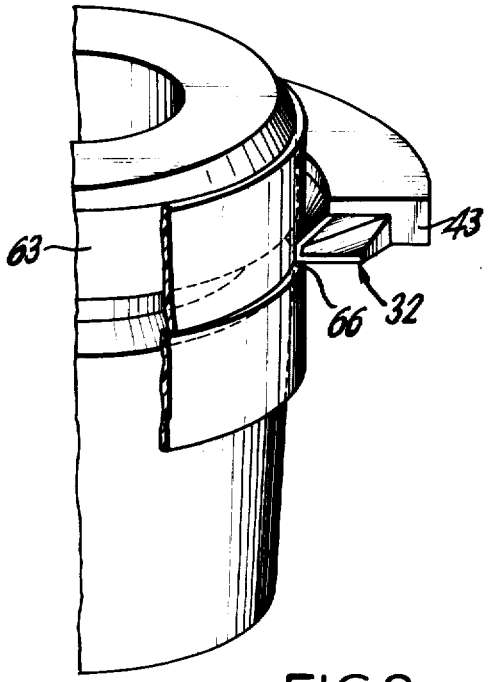
FIG. 8 is an enlarged perspective view showing the parison as it is being severed by being pressed between the upwardly moved blow pin and the shear insert.

The outer two ends of the shear insert 32 each have a flat portion 43 and a raised portion 44, which is raised above the flat portion 43. As shown in the enlarged drawing of FIG. 6, the raised portion 44 has a channel 45 which has two inwardly slanting bevels, respectively 46 and 47, which meet a three-sided outer edge consisting of top slanted side 48, inner vertical side 49, and bottom flat edge 50. The shear insert 32 has two screw-threaded holes 51 and 52 which align with holes 34 and 36, respectively, and also with holes 24 and 26 respectively. These holes 51 and 52 are screw-threaded and enable the shear insert 32 to be exactly aligned on the seal insert 31. It will be noted that both inserts consequently may be readily exactly aligned by placing them one on top of the other and placing them both on the shelf 14. The inward hexagonal screws are then inserted and, when tightened, will exactly align each of the inserts on the base 11.

Figure 2:
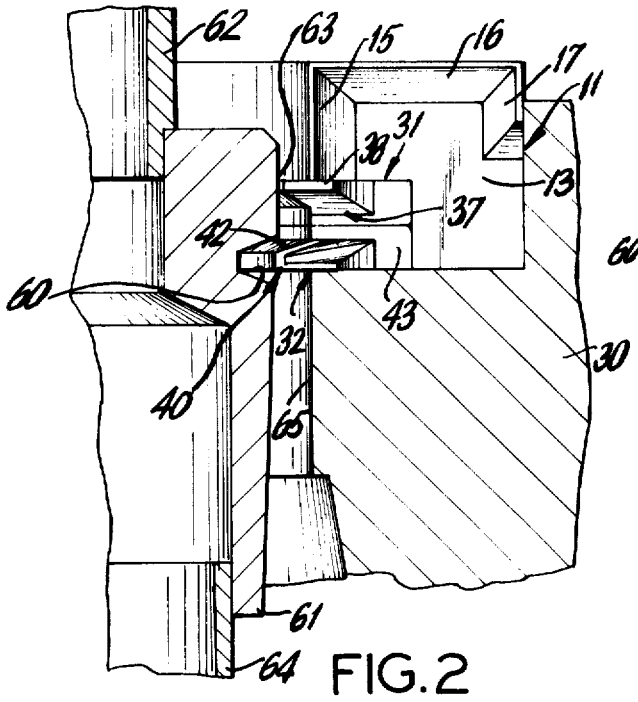
FIG. 2 is a one-half sectional side view showing the sealing member of the present invention located in the position when the blow pin is down and the mold is closed, but without the parison.

As shown in FIG. 2, the base 11 is attached by means of screws through the holes 20, 21, 22 and 23 to the neck ring 30 of the half-mold. When the blow pin 61 is down, as shown in FIG. 2, the bottom shear insert 32 has its edge 40 aligned opposite the groove 60 of the blow pin 61. The hollow and tubular blow pin 61 is cylindrical, centered about an imaginary central axis, and attached at the bottom of the blow tube 62. When the blow pin 62 is down, as shown in FIG. 2, the plastic resin material of the parison is sealed against the internal air pressure because the parison fills the space between the inner edge 29 of the seal insert 31 and the straight upper rim 63 of the blow pin 61. The compressed air is then expelled through a bottom tube 64 attached at the bottom end of the blow pin 61. That compressed air causes the parison to expand and fit closely to the cooled walls of the mold. The parison at its upper end will expand against the inner wall 65 of the neck ring 30.

Figure 3:
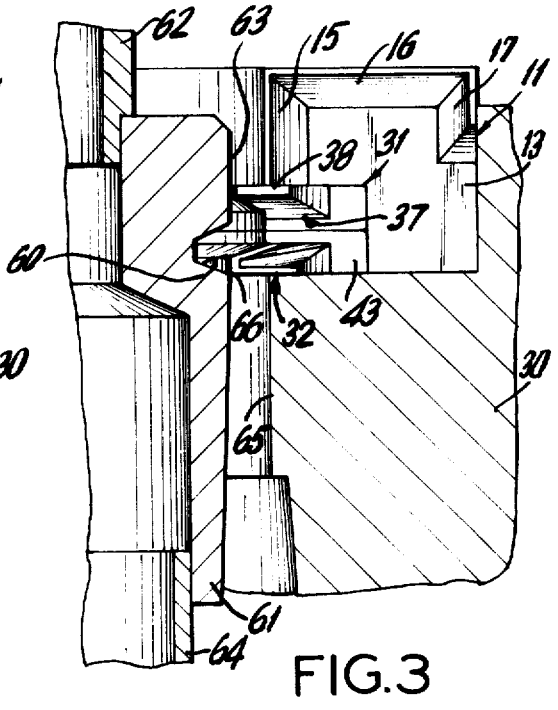
FIG. 3 is a sectional view similar to FIG. 2 but with the blow pin halfway up.

The blow pin 61 is then raised to the position shown in FIG. 3 in order to shear the neck of the formed parison. When the blow pin 61 is so raised, the inner edge 40 of the bottom shear insert 32 contacts the rim 66 of the blow pin 61 below its groove 60. That contact of the edge 40 with the blow pin 61 shears (severs) the parison.

The blow pin 61 is then raised, i.e., pulled further upwards (not shown) and the portion of the parison above the shear steel 32 is bent back on itself between the seal insert 32 and the bottom ring portion of the blow pin 61, that bottom ring portion being below circular rim line 66. As this is generally waste material, a separate drawing of that operation is not shown. The mold is then opened and the bottle is removed by its tail flashing (not shown). The cycle is then repeated and the blow pin is then again lowered to the position shown in FIG. 2 and the parison again flows over the blow pin. The mold is then closed, the sealing member closes and seals the parison at the top, and the remainder of the cycle is repeated.

Figure 4:
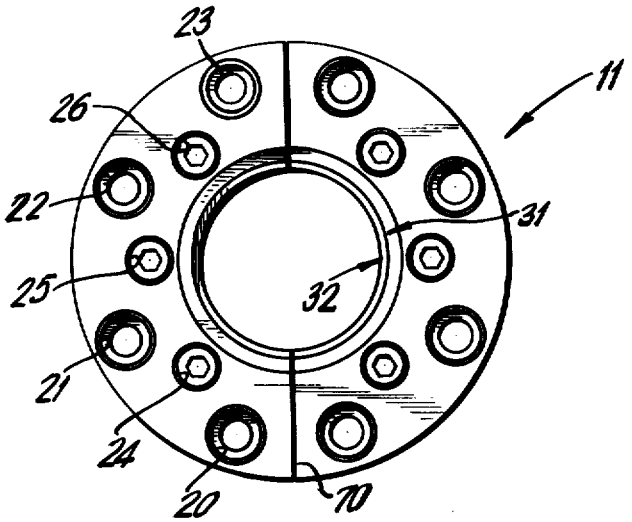
FIG. 4 is a top plan view of the sealing member of the present invention shown in its position when the mold is closed.
Figure 5:
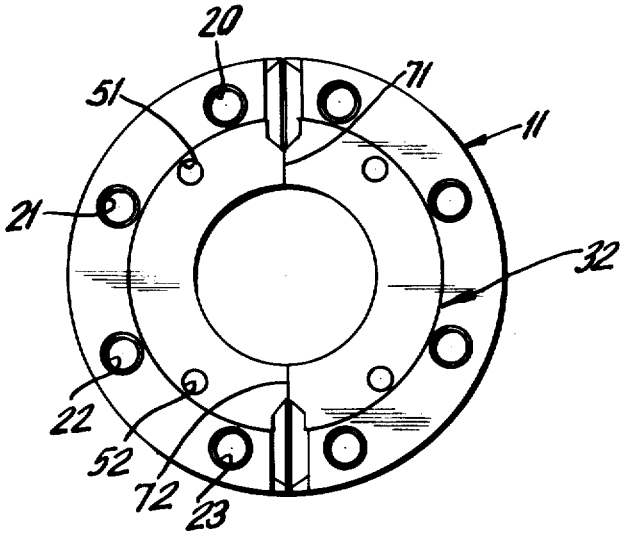
FIG. 5 is a bottom plan view of the sealing member of the present invention shown in its position when the mold is closed.

As shown in FIG. 4, the two base rings do not meet when the mold is closed. There is a small space 70 (for example, 0.025 inch) between their ends. If they did meet, upon closure of the mold the ends may soon become worn or damaged due to the large force with which the mold is closed. However, as shown in FIG. 5, the two bottom shear inserts 32, i.e., both parts of the complete ring, do touch and meet at the lines 71, 72 when the mold is closed. The two upper seal inserts 31 do not touch at the ends upon closure of the mold.

We claim:

1. In a blow molding machine in which a plastic resin parison is extruded in tubular form along an axis from an extruder around a vertically aligned blow tube and in which said blow tube delivers compressed air to expand the parison to form against the internal walls of a two-part separable mold when the separable mold is in its closed position, said mold being positioned beneath said extruder along the axis of the blow tube and having open and closed positions, the mold having a separable two-part top neck portion, said blow tube carrying a cylindrical blow pin having a cylindrical shoulder portion and a cylindrical shear portion, said blow pin being movable vertically upwards to aid in severing the parison after the mold parts are closed;

a plastic resin severing and closure device removably affixed at said top neck portion of each of said two mold parts and separable along with said mold parts, said device in cooperation with the blow pin severing the parison and providing an air-tight seal between the mold and the parison when the separable mold is in its closed position;

said severing and closure device comprising two base members, each base member being fixed to a top neck portion of one mold part and being operable to hold a top seal insert and a bottom shear insert fixedly in respect to the mold part, each base member being in approximate form of a one-half ring and having a flat surface generally perpendicular to said axis and having a flange portion extending generally perpendicularly from said flat portion, said flange portion being operable to align said top seal insert and said shear insert with respect to said axis, said base members being of a heat conductive metal alloy;

two top seal inserts each removably fixed to a base member and each in the form of a generally flat member and being approximately a one-half ring, each of said seal inserts being mounted such that an inner edge is close to but not touching said shoulder of said blow pin when the mold parts are closed in order to compress but not shear said parison and thereby to seal and permit blow pressure within said parison, said seal inserts being of heat hardened steel;

means removably affixing each of said seal inserts on one of said base members so that they are separable along with said mold parts;

two bottom shear inserts separable along with said mold parts, each bottom shear insert being in the form of a generally flat member and being approximately a one-half ring member, each of said shear inserts having an inner face which meets in a shearing action against said shear portion of said blow pin to shear the parison when the blow pin is moved vertically upwards, each of said shear inserts having an inner edge with an inner diameter which is less than the inner diameter of said inner edge of said seal inserts; each of said shear inserts being of heat-hardened steel; and means removably affixing each of said shear inserts on one of said seal inserts and touching the flange portion of one of said base members.

2. A closure device as in claim 1 wherein the inner edges of each of said seal inserts and said shear inserts are flat, and wherein each of said inner edges of each insert meets a cut-back portion and the said cut-back portions are assembled in facing relationship.

3. A closure device as in claim 1 wherein each of said base member is an aluminum alloy.

4. A closure device as in claim 1 wherein upon closure of said two mold parts the two ends of one of said shear inserts contact the two ends of the other of said shear inserts but the two ends of one of said base members do not contact the two ends of the other base member.

5. A closure device as in claim 1 wherein each end of each of said base members has three raised portions connected in the form of an unverted "U" and forming a pocket.

6. In a blow molding machine in which a plastic resin parison is extruded in tubular form along an axis from an extruder around a vertically aligned blow tube and in which said blow tube delivers compressed air to expand the parison to form against the internal walls of a two-part separable mold when the separable mold is in its closed position, said mold being positioned beneath said extruder along the axis of the blow tube and having open and closed positions, the mold having a separable two-part top neck portion, said blow tube carrying a cylindrical blow pin having a cylindrical shoulder portion and a cylindrical shear portion, said blow pin being movable vertically upwards to aid in severing the parison after the mold parts are closed;

a plastic resin severing and closure device removably affixed at said top neck portion of each of said two mold parts and separable along with said mold parts, said device in cooperation with the blow pin severing the parison and providing an air-tight seal between the mold and the parison when the separable mold is in its closed position, said severing and closure device comprising two base members, each base member being fixed to a top neck portion of one mold part and being operable to hold a top seal insert and a bottom shear insert fixedly in respect to the mold part, each base member being in the approximate form of a one-half ring and having a flat surface generally perpendicular to said axis and having a flange portion extending generally perpendicularly from said flat portion, said flange portion being operable to align said top seal insert and said shear insert with respect to said axis, said base members being of an aluminum alloy; each end of said base member being in a plane parallel to said axis and having three raised portions connected to form an inverted U;

two top seal inserts each removably fixed to a base member and each in the form of a generally flat member and being approximately a one-half ring, each of said seal inserts having a flat inner edge perpendicular to said axis and being mounted such that an inner edge is close to but not touching said shoulder of said blow pin when the mold parts are closed in order to compress but not shear said parison and thereby to seal and permit blow pressure within said parison, said seal inserts being of heat hardened steel;

means removably affixing each of said inserts on one of said base members so that they are separable along with said mold parts;

two bottom shear inserts separable along with said mold parts, each bottom shear insert being in the form of a generally flat member and being approximately a one-half ring member, each of said shear inserts having an inner face which meets in a shearing action against said shear portion of said blow pin to shear the parison when the blow pin is moved vertically upwards, each of said shear inserts having an inner edge which is flat and perpendicular to said axis and with an inner diameter which is less than the inner diameter of said inner edge of said seal inserts; each of said shear inserts being of heat-hardened steel; and means removably affixing each of said shear inserts on one of said seal inserts and touching the flange portion of one of said base members.

*7. In a blow molding machine in which a plastic resin parison is extruded in tubular form along an axis from an extruder around a vertically aligned blow tube and in which said blow tube delivers compressed air to expand the parison to form against the internal walls of a two-part separable mold when the separable mold is in its closed position, said mold being positioned beneath said extruder along the axis of the blow tube and having open and closed positions, the mold having a separable two-part top neck portion, said blow tube carrying a cylindrical blow pin having a cylindrical shoulder portion and a cylindrical shear portion spaced axially from said shoulder portion, said blow pin being movable axially vertically upwards to aid in severing the parison after the mold parts are closed;*

*a plastic resin severing and closure device removably affixed at said top neck portion of each of said two mold parts and separable along with said mold parts, said device in cooperation with the blow pin severing the parison and providing an air-tight seal between the mold and the parison when the separable mold is in its closed position;*

*said severing and closure device comprising two base members, each base member being fixed to a top neck portion of a respective mold part and being operable to hold a top seal means and a bottom shear means fixed with respect to the mold part, each base member being in the approximate form of a one-half ring and having a flat surface generally perpendicular to the axis of said blow pin and having a flange portion extending generally perpendicularly from said flat portion, said flange portion being operable to align said top seal means and said shear means with respect to said blow pin axis, said base members being of a heat conductive metal alloy;*

*two top seal means for compressing but not shearing and thereby sealing and permitting blow pressure within said parison, each of said seal means being associated with a respective base member and each being generally flat and being approximately a one-half ring, each of said seal means being mounted such that an inner edge thereof is close to but not touching said shoulder portion of said blow pin when the mold parts are closed, said seal means being of heat hardened steel;*

*two bottom shear means for shearing the parison when the blow pin is moved vertically upwards, each of said bottom shear means being separable along with said mold parts, each bottom shear means being generally flat and being approximately a one-half ring, each of said shear means having an inner face which meets in a shearing action against said shear portion of said blow pin, each of said shear means having an inner edge with an inner diameter which is less than the inner diameter of said inner edge of said seal means; each of said shear means being of heat-hardened steel; and*

*means removably affixing said shear means and said seal means so that they touch the flange portion of one of said base members and so that they are separable along with said mold parts.*

*8. A closure device as in claim 7 wherein the inner edges of each of said seal means and said shear means are flat, and wherein each of said inner edges meets a cut-back portion and the said cut-back portions are assembled in facing relationship.*

*9. A closure device as in claim 7 wherein each of said members is an aluminum alloy.*

*10. A closure device as in claim 7 wherein upon closure of said two mold parts the two ends of one of said shear means contact the two ends of the other of said shear means*

*but the two ends of one of said base members do not contact the two ends of the other base member.*

*11. A closure member as in claim 7 wherein each end of each of said base members has three raised portions connected in the form of an inverted "U" and forming a pocket.*

*12. A closure device as in claim 7 wherein said shear means and said seal means of the same base member are associated integrally with one another.*

* * * * *